United States Patent [19]

Futrell, II

[11] Patent Number: 4,854,166
[45] Date of Patent: Aug. 8, 1989

[54] LIGHTWEIGHT WADING ROD FOR STREAM FLOW MEASUREMENTS

[75] Inventor: James C. Futrell, II, Picayune, Miss.

[73] Assignee: United States of America, as represented by the Secretary of the Interior, Washington, D.C.

[21] Appl. No.: 124,533

[22] Filed: Nov. 10, 1987

[51] Int. Cl.$^4$ ................................................. G01F 1/5
[52] U.S. Cl. ...................................... 73/170 A; 73/198
[58] Field of Search ................ 71/170 A, 189; 73/198

[56] References Cited

U.S. PATENT DOCUMENTS

| | | | |
|---|---|---|---|
| 914,959 | 3/1909 | Lallie | 73/189 |
| 1,034,399 | 7/1912 | Buck | 73/189 |
| 1,593,291 | 3/1921 | Critchlow | 73/861.92 |
| 3,875,796 | 4/1975 | Gilliard | 73/170 A |

OTHER PUBLICATIONS

U.S. Geological Survey, Book 3, Chapter 48, 1969, pp. 9–11 by Buchanan et al.

*Primary Examiner*—Herbert Goldstein
*Attorney, Agent, or Firm*—E. Philip Koltos

[57] ABSTRACT

A wading rod for use in measuring depth and current flow velocity in streams, rivers, and the like is disclosed which comprises a base, a lightweight, non-metallic main rod extending from the base having gradations for measuring depth, a lightweight, non-metallic adjustable sliding rod having a locking means, a tailfin receiving means, a receiving means for a current meter, signal transmission means capable of transmitting a signal proportional to flow velocity from a current meter to a signal receiving means, said signal transmission means being disposed inside of said sliding rod, and a level indicator. The wading rod of the present invention is lighter, reads depth more accurately, is more convenient to use, and is more durable, accurate and versatile than prior art wading rods. This rod also operates in rivers of high specific electrical conductance, an improvement over prior art rods which tended to shunt out the meter signal when collecting velocity data in such rivers.

8 Claims, 1 Drawing Sheet

U.S. Patent
Aug. 8, 1989
4,854,166
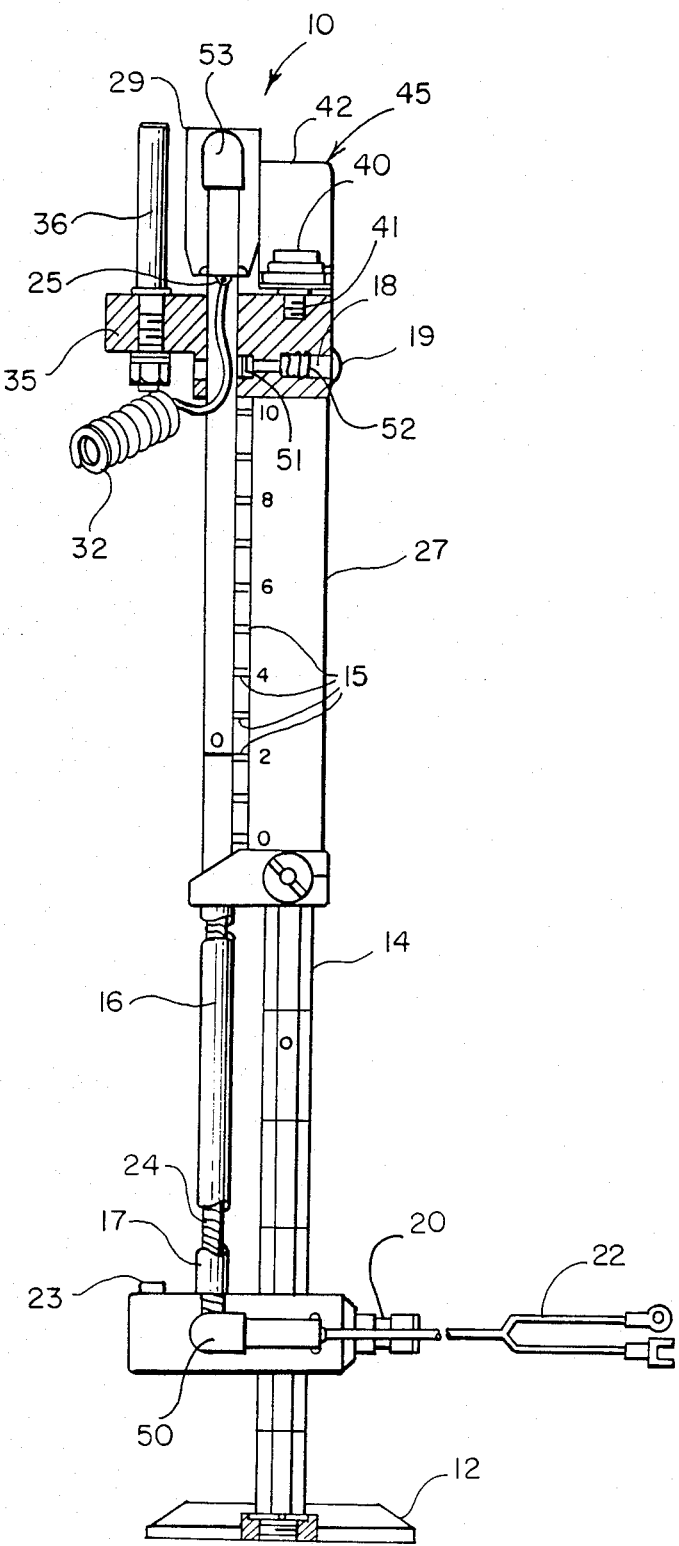

LIGHTWEIGHT WADING ROD FOR STREAM FLOW MEASUREMENTS

FIELD OF THE INVENTION

The invention relates in general to a flow measuring device, and in particular to a wading rod made of a lightweight, non-metallic material and used for measurements of current velocity in a small stream or river.

BACKGROUND OF THE INVENTION

In the scientific study of small streams and rivers, it is desirable to take accurate readings of the various hydrological parameters of the stream, particularly those involving river flow. In order to measure flow velocity, a variety of current flow meter devices have been developed specifically which test the current at desired levels underwater. In U.S. Pat. No. 1,034,399 (Buck) there is disclosed a current meter for measuring the velocity of air or a liquid which comprises a rod, a base, and fluid pressure chambers connected to tubes for receiving fluid and gauging fluid velocity. U.S. Pat. No. 1,862,935 (Langley) discloses a current meter which comprises a meter rod having stabilizers which can be supported by a pulley system and attachable to a boat station. Still other devices disclosed in the prior art include U.S. Pat. No. 1,593,291 (Critchlow) which discloses a flow meter having a velocity wheel suspendable in a fluid, and U.S. Pat. No. 4,122,714 (Kobayashi et al.) wherein a magnetic current meter is adapted to sense the flow of liquid through an open channel.

It is most preferable to measure flow velocity in a small stream or river by wading into the river and taking width, depth and velocity measurements with a hand-held rod having a current meter attached thereto. The current meter on this rod should be adjustable to any wadable depth so that the observation position of the current meter can be set. This rod should transmit the signal from the attached current meter internally to a read-out device which, preferably, also mounts on this rod in a manner that makes the read-out device easy to see and to operate. At present, the most commonly used wading rod for this purpose is known as a top-setting English wading rod (such as described in Buchanan et al., "Discharge Measurements at Gaging Stations", Techniques of Water Resources Investigations, U.S. Geological Survey, Book 3, Chapter 48, 1969, pp. 9-11) which is composed of metal parts and has external rod wires connecting a current meter to a signal receiving device, usually a telephone operator's headset. The device is operated by placing the rod so that the current meter is situated in the flowing stream while the hydrographer listens for clicks in the telephone operator's headset which will correspond to the revolutions of a bucket wheel which rotates within the yoke of the current meter. A determination of velocity is made depending on the number of clicks or revolutions of the bucketwheel received over a measured period of time as determined using a stopwatch.

The use of the top-setting English wading rod encounters several major drawbacks, however, which can lead to inaccuracies in the velocity readings or make the flow readings difficult or impossible to obtain. In particular, the English rod has a low degree of noise rejection in streams with high specific electrical conductance. As a result, when the conductance in a stream is higher than normal, the English rods will not work with newly developed electronic read out devices such as a current meter digitize (or CMD). Additionally, the hex and round rods of the English Wading Rod are part of the electrical circuitry for this equipment, and thus expose a considerable surface area of the path of the electrical circuit to the fluid in which the equipment is immersed. If this fluid has a specific electrical conductance in the range of normal drinking water or greater, the immersed rod will decrease the resistance of the circuit and shunt out the meter signal to the CMD in many cases. The English rod also lacks any leveling device, and is placed in a vertical position using the hydrographers "best guess" only. This may allow the meter to be positioned out of vertical alignment with the flow streamline and cause a velocity reading error. Finally, the English rod is heavy, bulky and awkward, difficult to set up, and unwieldy to use. What is desired is a lightweight, durable, internally wired wading rod that isolates the electronic signal from the stream, and which can be used safely, accurately and conveniently as well.

SUMMARY OF THE INVENTION

In accordance with the present invention, a novel wading rod is provided for safe, accurate, convenient and effective use in measuring stream flow velocity which comprises a base, lightweight non-metallic rods, including a front stationary rod and a rearward adjustable sliding rod with locking means, means on the sliding rod to receive a current meter, means to transmit the signal received from the current meter to a signal receiving means that can attach to the top of the rod, and a level indicating device attached at the top of the wading rod. The signal transmission means comprises a series of wires and underwater connectors, which are insulated from the measured fluid, and which extend from the current meter receiving means to the signal receiving means, either a telephone operator's headset or a current meter digitizer. The wires are preferably insulated by being disposed inside of the adjustable sliding round rod. The hexagonal front and round sliding rods can be comprised of compression molded carbon fiber braided prepeg material, or of fiberglass, which will make the wading rod of the present invention rigid, light, more accurate, and useable in high specific electrical conductance fluids, all of which make it superior to prior art versions.

BRIEF DESCRIPTION OF THE DRAWING FIGURE

The drawing figure is a side, partially cutaway view of the wading rod of the present invention.

DETAILED DESCRIPTION OF THE PREFERRED EMBODIMENTS

The wading rod 10 of the present invention, as observed in the drawing figure comprises a base 12, front rod 14, sliding rod 16 having locking means 18, current meter receiving means 20, a signal transmission means which comprises underwater snap-together connector means 50 to attach a lead wire from a current meter (not shown) and a series of wires 24 disposed inside of sliding rod 16, and level indicator 40. Both front rod 14 and sliding rod 16 are comprised of a lightweight durable non-metallic material such as carbon fiber braided prepeg or fiberglass which makes the rod lighter and easier to handle. Along the upper part 27 of the front rod 14 are a series of graduations 15 which are used to position the current meter in the flow at 0.2, 0.6, or 0.8 tenths of the depth that is being measured once the wading rod 10 is positioned on the stream bed. The scale 15 on the handle is positioned directly next to the foot number on the sliding round rod in order to allow accurate positioning of the flow measuring device, as will be described further below. The front rod of the present invention is graduated in feet and tenths of feet in order to measure the depth of the stream prior to making a velocity observation.

The sliding rod 16 is positioned rearwardly of front rod 14 and is adjustable to a particular depth when the measurement of flow velocity is to be taken, much in the same manner as the prior art English wading rod. The adjustable sliding rod 16 can be set and secured by locking means 18, which in the preferred embodiment comprises a releasable rubber lined plate 51 through which a rod passes into a rubber lined hole. Releasable plate 51 is spring operated so that it holds the sliding rod 16 in a fixed position with its rubber lining until and after adjustment is made by the operator. When it is desired to adjust the sliding rod, the plate 51 is released by pressing on button 19, which releases the sliding rod to allow for proper adjustment. After the desired depth level for the current meter receiving means 20 is obtained, the operator releases button 19, and the plate 51 will once again hold the sliding rod 16 in a new fixed position by spring and plate tension. The locking mechanism can provide adjustable tension of the sliding rod if desired by the use of a spring 52 on inside button 19. This spring adjusts the tension of plate 51 on rod 16. This spring tension is altered by turning button 19 clockwise to increase tension. A tension increase is needed when a heavier current meter is installed on the rod. Also, a small set screw inside button 19 holds the preset tension adjustment.

The current meter receiving means 20 is attached at the lower end 17 of the sliding rod 16, and is provided in order to receive and retain a current meter (not shown) which will be used to measure flow velocity. The current meter receiving means includes underwater connector 50, which snaps onto wire attachment means 22, which can receive the lead wires from a suitable current meter and allow for the receipt and transfer of a signal from the current meter. This signal will be proportional to the flow velocity in the stream. The receiving means 20 can also include a screw means 23 for the attachment of a current meter tailfin. These tailfins (not shown) are often used when a large meter is used on the rod in high-velocity flow and help is needed to keep the current meter aligned with the flow streamline. Any conventional vertical-axis current-meter can be employed with the wading rod of the present invention, such as cat's whisker-type or optic head-type current meters.

Once attached to the wading rod, the current meter will be able to transmit a signal that is proportional to the flow velocity through the signal transmission means to a signal receiving device where the signal will be translated into a velocity reading. In the wading rod of the present invention, the signal transmission means comprises a series of wires 24 which run from the current meter receiving means 20 via the underwater connector 50 to a suitable signal receiving device (not shown). The signal transmission wires 24 are disposed inside of the sliding rod 16, which is molded hollow to contain and protect the signal wires. By placement of the wires inside the hollow sliding rod, the main electrical connections of the wading rod of the present invention are highly insulated. This allows one to use the rod in rivers having a high specific electrical conductance. The signal transmission wires 24 run through the length of sliding rod 16, and terminate at the upper and 25 of the rod in the form of another underwater connector 53 where they can be attached to suitable signal receiving means by means of coiled lead wire 32, a military type connector (not shown), or any other conventional cable attachment means. The wading rod also includes a cap 29 for the upper end of sliding rod 16 to retain the underwater connector termination.

With the wading rod of the present invention, there are two preferable signal receiving means which can be employed in order to obtain a flow velocity reading. One means used is a conventional telephone operator's headset (not shown) by which one listens to audible click signals from a cat's whisker type current meter while using a stopwatch to obtain revolutions per unit time readings, which are then used to calculate flow velocity. The telephone operator's headset, which will be attached to a lead wire 32 extending from the upper end 25 of sliding rod 16, will be used when a cat's whisker-type current meter (such as the Price Type AA current meter) is used with the wading rod.

It is particularly preferred, however, to employ a current meter digitizer, or CMD (not shown), as the signal receiving means for the wading rod, which can be used with both the cat's whisker-type current meter and an optic head-type current meter (such as disclosed in my co-pending U.S. application No. 094,975, filed Sept. 10, 1987). The current meter digitizer will also attach to the lead wire 32, and a standard 6 pin military type connector can be used to connect the wire to the CMD. When in operation, a signal from the current meter is received by the CMD and a reading of revolutions per unit time is first given, followed by a digital reading of flow velocity. In order to make it more convenient for the hydrographer to operate and observe a CMD (about the size of two packs of cigarettes), a CMD support rod 36 is provided which is attached to handle extension 35 of the wading rod 10. The CMD can thus fit conveniently on the wading rod, and allows for quick and simple readings of flow velocity for the hydrographer in the stream.

Another feature of the wading rod of the present invention is the level indicator 45 attached to handle extension 35 on the upper part of the front rod 14. The level indicator 45 contains a circular indicator bubble 40 disposed inside of an extended swivelable mirror 42. The level indicator is operated by swiveling the mirror until the bubble comes into view. This allows the user to tell if the wading rod is level, i.e., if the rod is perpendicular to the stream bed. The level indicator allows one to tell if the rod is precisely vertical without resorting to an individual's "best guess" in a flowing river which can often be deceiving due to the pressure of the flowing water on the rod and the meter. If the rod is not level, the rod can be maneuvered until a level point is reached. The swivelable mirror 42 allows the user to observe the indicator bubble from any angle no matter how the operator places the wading rod to take the flow measurements. The level indicator is securely attached to the handle extension 35 of the wading rod by means of a screw 41 which is an intergral part of the leveling device 45.

In operation, a hydrographer will use the wading rod of the present invention to measure fluid depth and flow velocity of small streams and rivers which are not too deep or swift to wade. In order to take these measurements, the operator wades out in the stream, and places the base of the wading rod on the river floor, ensuring that the device is level (perpendicular to the river floor) by viewing the level indicator bubble. Once the device is set, the hydrographer then reads off the depth using the gradations located on the shaft of the front rod. At this point, the current meter, retained by the current meter receiving means on the wading rod and attached to the lower end of the adjustable sliding rod, is set at a desired level for measuring flow (usually two, six or eight tenths of total depth) by adjusting the sliding rod until the desired depth is achieved. The current meter and the sliding rod are then locked in place using the locking means, which normally will comprise the spring-activated plate which when released will secure the sliding rod at the desired position. In this position, the current meter will respond accurately to the flow, and generate a signal proportional to flow velocity which is transmitted through the wading rod, and preferably is received by the current meter digitizer (CMD). The CMD will give a digital reading of revolutions of the current meter's bucket wheel rotation, as well as the number of seconds elapsed during data collection, followed or replaced by an actual velocity reading.

Using the wading rod of the present invention in this manner, one can thus obtain readings of depth and flow velocity in small streams and rivers with greater accuracy. The lighter rod is easier to use and is not as prone to sink in soft river bottoms to generate a depth error prior to reading the river depth. The level bubble tends to assist the hydrographer in keeping the rod level while reading velocity and this promotes greater accuracy in velocity readings since the meter will be correctly aligned in the flow streamline. Rivers of high specific electrical conductance may be measured using a CMD instead of a stopwatch and a telephone operator's headset, and this too will provide a more accurate velocity reading because the CMD gives correct count numbers even after extensive use or under conditions of swift flow that require rapid counting. In all aspects, the wading rod of the present invention will be more convenient to use and will provide more accurate flow velocity measurements than prior art versions.

What is claimed is:

1. A wading rod for use in measuring current flow velocity in streams, rivers, and the like comprising:
    a base;
    a lightweight, non-metallic front rod extending from said base and having gradations along its shaft which indicate depth of the stream;
    a lightweight, adjustable non-metallic sliding rod disposed rearwardly of said front rod;
    means for adjustably mounting said sliding rod on said front rod for sliding movement therealong so as to permit the distance between the sliding rod and the base to be varied;
    locking means for setting the position of said sliding rod along said front rod;
    a current meter for generating a signal which is proportional to flow velocity;
    current meter receiving means located at the lower end of said sliding rod for mounting said current meter on the wading rod;
    a current meter digitizer for providing a digitized readout of the signal generated by said current meter;
    signal transmission means for receiving a said signal from said current meter and for transmitting said signal to said current meter digitizer, said signal transmission means comprising a plurality of electrical wires constituting the main electrical connections of the wading rod disposed inside of said non-metallic sliding rod;
    support means provided at the upper end of said wading rod for supporting said current meter digitizer;
    a level indicator for indicating whether or not the wading rod is perpendicular to a stream bed in which the wading rod is placed.

2. A wading rod according to claim 1 wherein the current meter comprises a cat'whisker-type current meter.

3. A wading rod according to claim 1 wherein the current meter comprises an optic head-type current meter.

4. A wading rod according to claim 1 wherein said lightweight, non-metallic front and sliding rods are comprised of carbon fiber braided prepeg.

5. A wading rod according to claim 1 wherein said lightweight, non-metallic front and sliding rods are comprised of fiberglass.

6. A wading according to claim 1 further including means for attaching a current meter tailfin.

7. A wading according to claim 1 wherein the locking means comprises a releasable locking plate which is pressed to release said sliding rod and allow rod adjustment, and released to set the sliding rod and meter at the desired depth.

8. A wading rod according to claim 1 wherein the level indicator comprises a circular level bubble attached to the top of said wading rod, said level bubble being disposed in a swivelable mirror to allow the user to determine from any angle whether or not the wading rod is level.

* * * * *